(12) United States Patent
Roos

(10) Patent No.: US 9,976,767 B2
(45) Date of Patent: May 22, 2018

(54) AIR-TO-AIR HEAT EXCHANGER

(71) Applicant: Roos GmbH, Boppard (DE)

(72) Inventor: Christoph Roos, Boppard (DE)

(73) Assignee: Roos GmbH, Boppard (DE)

( * ) Notice: Subject to any disclaimer, the term of this patent is extended or adjusted under 35 U.S.C. 154(b) by 0 days. days.

(21) Appl. No.: 15/023,433

(22) PCT Filed: Oct. 1, 2014

(86) PCT No.: PCT/EP2014/071038
§ 371 (c)(1),
(2) Date: Mar. 21, 2016

(87) PCT Pub. No.: WO2015/055435
PCT Pub. Date: Apr. 23, 2015

(65) Prior Publication Data
US 2016/0231016 A1    Aug. 11, 2016

(30) Foreign Application Priority Data
Oct. 14, 2013   (DE) .......................... 10 2013 111 290

(51) Int. Cl.
*F24F 12/00* (2006.01)
*F24F 13/30* (2006.01)
(Continued)

(52) U.S. Cl.
CPC ............ *F24F 12/006* (2013.01); *F24F 13/30* (2013.01); *F28D 7/103* (2013.01); *F28D 7/16* (2013.01);
(Continued)

(58) Field of Classification Search
CPC ........ F28F 9/005; F28F 9/22; F28F 2009/222; F28F 2009/224; F28F 2009/226;
(Continued)

(56) References Cited

U.S. PATENT DOCUMENTS 2,389,175 A  *  11/1945  Woods ................. B23K 1/0012
                                                             228/183
2,488,333 A  *  11/1949  Schlachter ............ F24F 12/001
                                                              165/154
(Continued)

FOREIGN PATENT DOCUMENTS

DE            19835473 A1 *  2/2000 ............. F24F 7/013
DE        102004046587 A1    4/2006
(Continued)

*Primary Examiner* — Frantz Jules
*Assistant Examiner* — Lionel Nouketcha
(74) *Attorney, Agent, or Firm* — Richard M. Goldberg

(57) ABSTRACT

Air-to-air heat exchanger for ventilation systems with two countercurrent air flows disposed inside a cylindrical housing, a first air flow circulating inside the heat exchanger inside closed pipes, while the second air flow is in spaces between the pipes and cylindrical housing, and a fan moving the countercurrent air flows and disposed at one end of the cylindrical housing, with the fan including concentric inner and outer rings separated by a wall for moving air in opposite directions, a bunch of straight, parallel pipes whose end elements at the fan side are tightly gathered together, in the end of a cylindrical wall and, on the opposite side, in the end of a cylindrical pipe fitting, and between end elements, taper into middle sections between which are spaces, and a sleeve lining the inner wall of the housing at the middle sections and constricts the inner diameter of the housing.

6 Claims, 3 Drawing Sheets

(51) Int. Cl.
*F28F 9/18* (2006.01)
*F28F 1/00* (2006.01)
*F28D 21/00* (2006.01)
*F28F 9/00* (2006.01)
*F28D 7/10* (2006.01)
*F28F 13/12* (2006.01)
*F28D 7/16* (2006.01)

(52) U.S. Cl.
CPC ......... *F28D 21/0014* (2013.01); *F28F 1/006* (2013.01); *F28F 9/005* (2013.01); *F28F 9/182* (2013.01); *F28F 13/12* (2013.01); *F24F 12/001* (2013.01); *F28D 7/163* (2013.01); *F28D 7/1607* (2013.01); *F28F 2235/00* (2013.01); *F28F 2250/08* (2013.01); *F28F 2250/104* (2013.01); *F28F 2255/143* (2013.01); *Y02B 30/563* (2013.01)

(58) Field of Classification Search
CPC ...... F28F 2009/228; F28F 13/06; F28F 13/08; F28F 13/12; F28F 2250/00; F28F 19/02; F28F 21/061; F28F 2245/08; F28F 2265/06; F28F 2265/22; F28F 3/005; F28F 3/08; F28F 7/1607; F28F 7/163; F28F 7/1638; F28F 12/0001; F28D 9/00; F28D 9/0006
USPC ................................. 165/177, 154, 159, 160
See application file for complete search history.

(56) References Cited

U.S. PATENT DOCUMENTS

| | | | | |
|---|---|---|---|---|
| 4,330,036 A | * | 5/1982 | Satoh | F28F 1/42 165/179 |
| 4,616,696 A | * | 10/1986 | Brundrett | A01G 9/24 165/46 |
| 5,297,819 A | * | 3/1994 | Harder | F16L 37/05 285/315 |
| 5,922,438 A | * | 7/1999 | Scharkowski | B03C 3/49 428/116 |
| 2003/0034152 A1 | | 2/2003 | Lomax et al. | |
| 2005/0135978 A1 | * | 6/2005 | Hamedi | B01J 8/065 422/198 |
| 2011/0000157 A1 | * | 1/2011 | Rickie | E04B 1/74 52/302.1 |
| 2013/0025822 A1 | * | 1/2013 | Ryu | F24F 12/006 165/67 |

FOREIGN PATENT DOCUMENTS

| | | | | |
|---|---|---|---|---|
| DE | 102005035712 A1 | | 2/2007 | |
| DE | 102005045734 A1 | | 4/2007 | |
| DE | 102006035531 A1 | | 1/2008 | |
| DE | 102006051903 A1 | | 5/2008 | |
| DE | 102008058817 A1 | * | 5/2010 | ........... F04D 19/022 |
| EP | 2077428 A2 | | 7/2009 | |
| EP | 2148074 A2 | | 1/2010 | |

\* cited by examiner

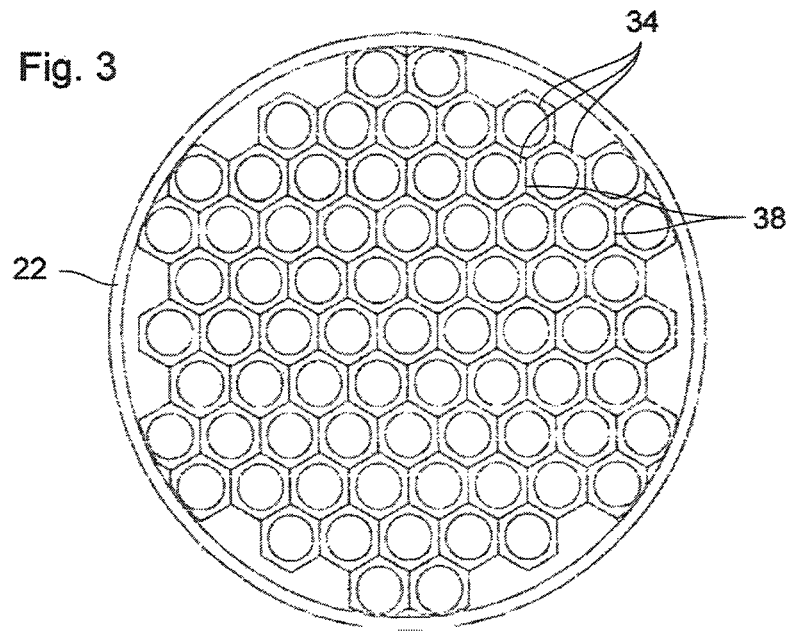
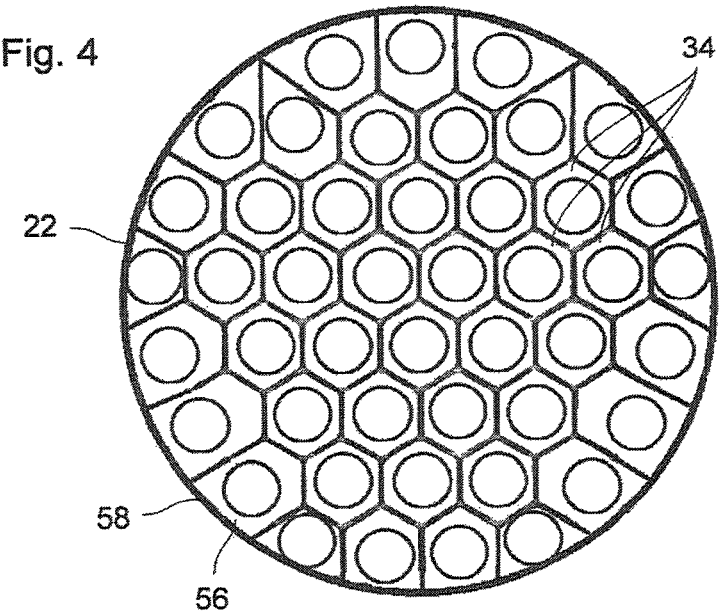

AIR-TO-AIR HEAT EXCHANGER

BACKGROUND OF THE INVENTION

The invention relates to an air-to-air heat exchanger for ventilation systems.

The insulation values required of building envelopes under current building regulations relative to heated buildings are such that controlled ventilation is a necessity. Such ventilation serves to transport stale air, i.e. air carrying pollutants and moisture, to the outside, replacing it with fresh, oxygen-filled exterior air. This used to be accomplished by means of regular ventilation via windows and doors, although this often cannot be done to a sufficient degree, for example when residents are absent for any length of time. Furthermore, such ventilation replaces the heated air on the inside with cold air from the outside, which in turn requires energy to heat the fresh air. For reasons of cost and ecology, this is not desirable.

Various types of ventilation installations based on heat recovery have long been in use. Part of the energy content of the heated waste air is transferred to the incoming fresh air. This is generally achieved using cross-flow heat exchangers or rotary heat exchangers, both of which are very complex in their construction, and hence relatively expensive. Reverse air ventilators are another variant, where a fan changes its direction of rotation at regular intervals, and therefore the direction in which air is conveyed, ensuring that a proportion of stale indoor air is first blown outside and then replaced with fresh air drawn inwards.

Counterflow heat exchangers are disclosed in, for example, DE 10 2006 051 903 A1, DE 10 2006 035 531 A1, DE 10 2005 045 734 A1, DE 10 2005 035 712 A1 and DE 10 2004 046 587 and EP 2 077 428 A2. German patent application DE 10 2008 058 817 A1, which represents the closest prior art, discloses an air-to-air heat exchanger operating according to the countercurrent principle where a first air flow is guided inside closed pipes whilst a second air flow, which flows counter to the first air flow, is located in an intermediate space between the pipes and the cylindrical exterior housing. For the purpose of moving the countercurrent air flows there is a fan disposed on one end of the cylindrical housing, comprising an inner ring and an outer ring disposed concentrically around the inner ring to transport air in the opposite direction. The spaces occupied by the outer ring and the inner ring are separated from each other by a cylindrical wall. In one embodiment, the pipes leaving the fan initially diverge conically, then run parallel and finally converge conically. In this way the second air flow circulates around the pipes in the intermediate space between the pipes, thereby allowing an efficient exchange of heat.

The design of this heat exchanger is relatively complex, however, and correspondingly costly to produce. In addition, further ways of improving the efficiency of this heat exchanger are still being sought.

SUMMARY OF THE INVENTION

Hence it is a task of the present invention to provide design improvements to the above-described heat exchanger disclosed in DE 10 2008 058 817 A1, in particular by simplifying its design to make production more cost-effective. Furthermore, the optimised heat exchanger should be as effective, or even more so, than the state-of-the-art heat exchanger.

These tasks are solved according to the invention by means of an air-to-air heat exchanger.

The heat exchanger according to the invention comprises a bunch of straight parallel pipes, the end elements of which, on the side closest to the fan, are enclosed in the ring-shaped end of the cylindrical wall separating the spaces occupied by the outer ring and the inner ring, whilst the end elements of the pipes at the opposite side are enclosed in the end of a corresponding cylindrical pipe fitting. The end elements are disposed very close together, with no space inbetween, so that no air can circulate between adjacent end elements. Between the end elements, the pipes taper to form middle sections, between which there are intermediate spaces inside the bunch. This allows the countercurrent air, that is the second air flow, to enter into the bunch and circulate freely around the middle sections of the pipes. In the vicinity of these middle sections the inner wall of the housing is lined with a sleeve or cup-shaped insulating insert which can simply be inserted or pushed inside the housing, for example. The insulating insert reduces the inner diameter of the housing, thereby constricting the flow cross-section. The second air flow, which is directed through the outer ring, is sucked inwards by this constriction so that it necessarily circulates around the pipes and re-exits the bunch of pipes radially behind the insulating insert. The insulating insert serves primarily for thermal insulation but may additionally function as acoustic insulation.

The guiding of the first air flow inside the pipes is simplified in that straight and parallel pipes can be used. These need only be fitted with correspondingly contrived end elements which are disposed very close to each other and are suitable for enclosure in the cylindrical wall or opposite pipe fitting. Bonding, welding or similar can be used to seal off adjacent end elements with respect to each other. The pipes themselves can be made from pipes drawn in the customary manner, for example, whose ends are simply widened and shaped such that they can be assembled in the above-described manner without intermediate spaces. It is also possible to bring the end elements together at each end of the bunch of pipes to form a single one-piece component so that adjacent end elements are separated from each other by separating walls, forming a cross-section with a honeycomb structure.

In one preferred embodiment of this invention at least part of the end elements is provided with a polygonal cross-section. The sides of the polygons then form the contact and separating surfaces of the end elements.

This polygonal cross-section of the end elements is preferably a hexagon.

Further, at least the end elements at each end of the bunch are preferably contrived as a single piece made from an injection-moulded part and form a honeycomb structure inside this injection-moulded part.

Inside this injection-moulded part, the end elements may preferably be fitted with connecting elements to receive pipe sections forming middle sections. The injection-moulded part may also comprise the ring-shaped end section of the cylindrical wall or pipe fitting which encloses the end elements.

Further, the middle sections of the pipes preferably have a structured inside and/or outside surface. This creates turbulence which improves the heat transfer between the air flows. Such structures can be formed, for example, by beading or projections on the pipe surfaces.

According to another embodiment of the invention, the end elements are tightly connected with each other, with the ring-shaped end of the cylindrical wall and/or with the end of the opposite cylindrical pipe fitting by means of bonding or welding.

Further, the insulating insert preferably has end surfaces with a sloping cross-section, via which the inner diameter of the insulating insert transitions into the larger inner diameter of the adjacent inner wall sections of the housing. Starting from the fan, the second air flow therefore flows through the outer ring, comes into contact with one of these sloping end surfaces at one end of the insulating insert and is pressed via the latter towards the inside of the bunch of pipes. The insulating insert extends along a longitudinal section of the bunch which is sufficient to ensure an efficient heat exchange between the air flows. At the end of the insulating insert the flow cross-section widens again via a sloping end surface which guides the second air flow back outside around the cylindrical pipe fitting enclosing the pipe end elements opposite the fan.

Further, the inner wall of the housing preferably has a structured surface. This creates turbulence which ensures improved heat transfer between the air flows.

According to another preferred embodiment the insulating insert is made of expanded plastic.

BRIEF DESCRIPTION OF THE DRAWINGS

Preferred examples of embodiments of this invention will be described in more detail below with reference to the attached drawings, in which FIGS. 3 and 4 are top views of the ends of the enclosed pipe bunch inside the heat exchanger of FIGS. 1 and 2.

DETAILED DESCRIPTION

Figure 1:
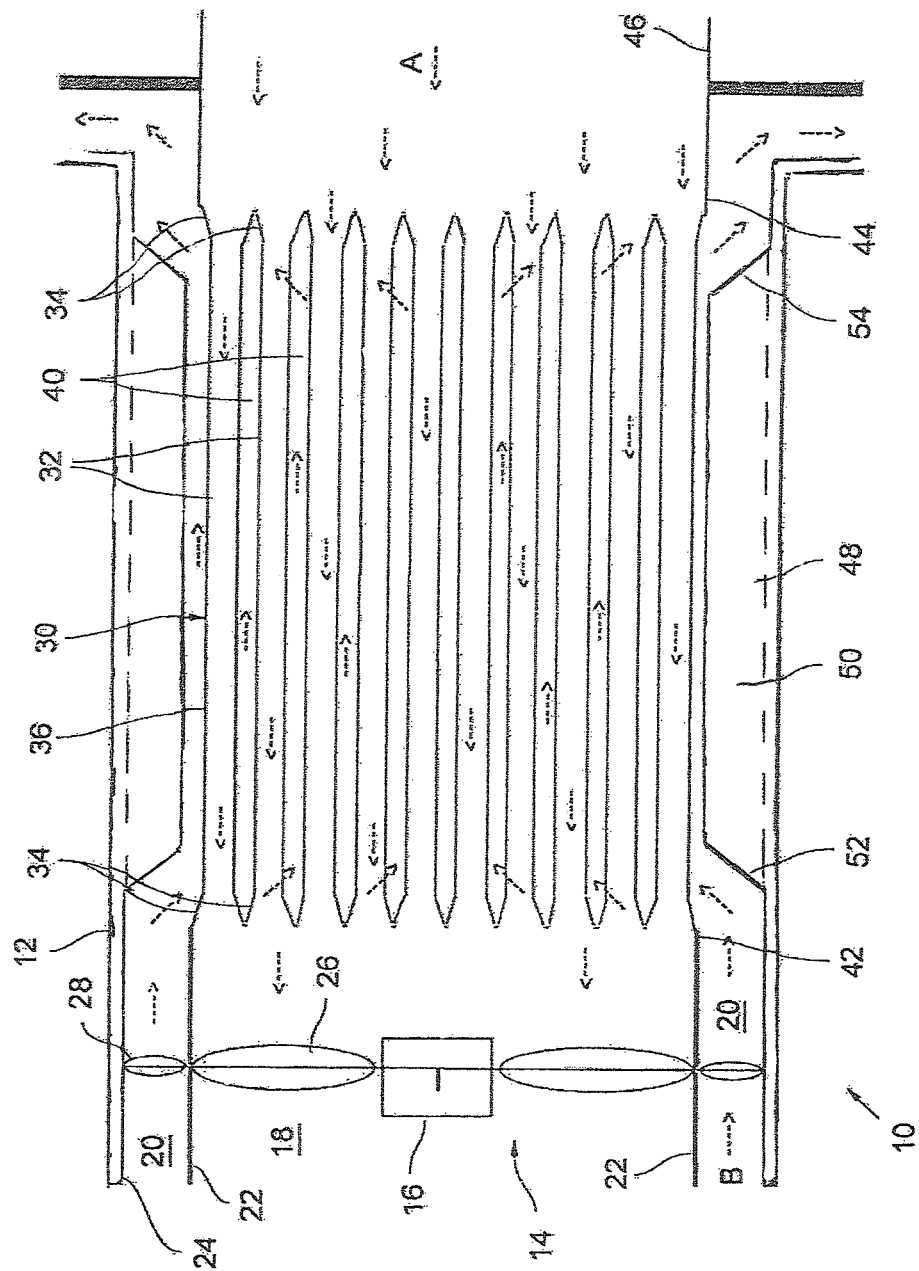
FIGS. 1 and 2 are schematic longitudinal sections through an embodiment of the air-to-air heat exchanger according to the invention.
Figure 2:
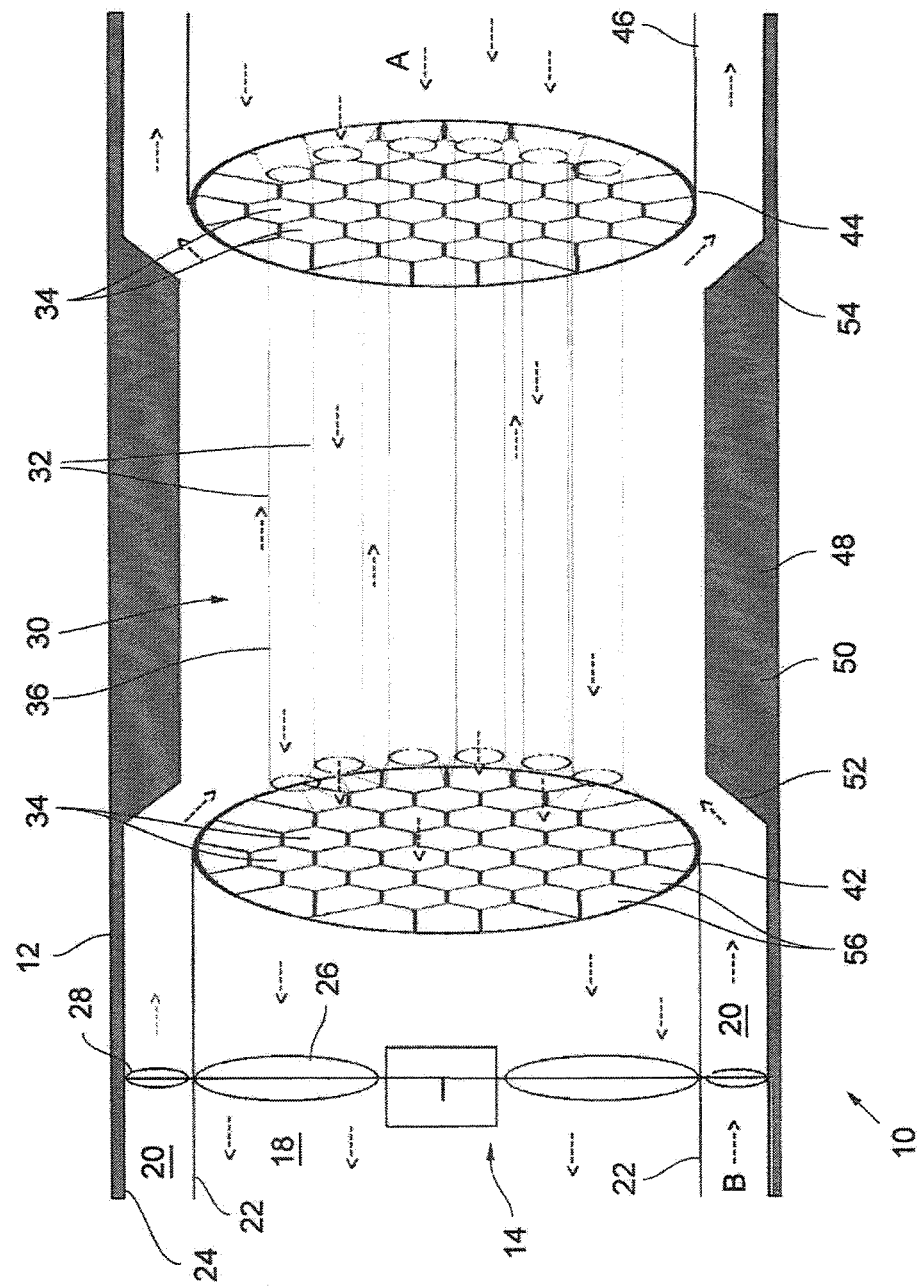

The heat exchanger 10 shown in FIGS. 1 and 2 is an air-to-air heat exchanger with a cylindrical housing 12 which is open at either end. At one end of the housing 12 (on the left of the figures) a fan 14 is inserted inside housing 12. The axis of rotation of fan 14 corresponds to the pipe axis of housing 12. The term "cylindrical" in relation to housing 12 is not intended to designate a perfectly cylindrical shape, but rather deviations from this are possible, such as a polygonal cross-section for example.

Fan 14 is driven by a motor 16 positioned on its centre axis. The space around motor 16 forms an inner ring 18 around which an outer ring 20 is arranged, which encloses inner ring 18. Inner ring 18 and outer ring 20 are separated by a cylindrical wall 22. Outer ring 20 is delimited towards the outside by the inside wall 24 of housing 12.

Airflows are transported in opposite directions inside inner ring 18 and outer ring 20. The air flow inside inner ring 18 will be referred to below as the first air flow, by means of which the air is transported out of housing 12 at the end of heat exchanger 10 where fan 14 is disposed. A second air flow is transported inside outer ring 20, by means of which the air at the end fitted with the fan is transported into heat exchanger 10.

For the purpose of moving these opposite air flows, the impeller of fan 14 extends radially outwards into outer ring 20. Blades 26 of inner ring 18 are positioned opposite blades 28 of outer ring 20 so that when fan 14 rotates, the air in rings 18,20 can be moved in opposite directions, creating the first and second air flows as described above.

The arrangement of fan 14, inner ring 18, outer ring 20 and the separating cylindrical wall 22 is substantially disclosed in German patent application DE 10 2008 058 817 A1.

Inside heat exchanger 10, the opposite air flows exchange heat with each other but are transported inside separate structures so that the two air flows cannot mix with each other. These structures comprise a central pipe bunch 30 comprising a plurality of straight, parallel pipes 32. The end elements 34 of these pipes 32 have a cross-section which differs from the cross-section of middle sections 36 of pipes 32 between end elements 34. Whilst in this instance, middle sections 36 have a circular cross-section, end elements 34 are widened to form a polygonal cross-section. In the top views in FIGS. 3 and 4, one can see that this polygonal cross-section is a regular hexagon. Due to this shape, end elements 34 can be gathered into a regular honeycomb structure as can easily be seen in FIGS. 3 and 4. No spaces remain between end elements 34 because these end elements 34 are disposed close together, so that air cannot circulate between them.

End elements 34 may be grouped together as one piece in a single injection-moulded plastic part with a cross-section having a honeycomb structure. This injection-moulded part can also comprise other connecting components such as connecting pieces for receiving pipe sections forming middle sections 36. The ends of the middle sections can be bonded or inserted onto or into these connecting pieces.

As can be seen in FIG. 1 in particular, middle sections 36 of pipes 32 are not positioned close to each other inside bunch 30. Rather, there are spaces 40 between these middle sections 36, inside which air can circulate.

At the end associated with fan 14, end elements 34 of pipes 32 are tightly enclosed in the ring-shaped end 42 of cylindrical wall 22 which separates inner ring 18 and outer ring 20 from each other. The term "tight" is used here to mean that air cannot flow along the side of pipe bunch 30, but instead, a flow-proof enclosure of bunch 30 is ensured inside the ring-shaped end 42 of wall 22. In the same manner, the opposite end elements 34 on the side of heat exchanger 10 opposite fan 14 (on the right in FIG. 1) are enclosed in the end 44 of a cylindrical pipe fitting 46, whose diameter is approximately the same as that of cylindrical wall 22. This enclosure of pipe bunch 30 is flow-proof too, i.e. cylindrical pipe fitting 46 encloses pipe bunch 30 such that no air can flow past bunch 30. It is understood that at this end too, end elements 34 are enclosed such that they are flow-proof. The ring-shaped end 42 of cylindrical wall 22 and/or the end 44 of a cylindrical pipe fitting 46 may also be formed by the injection-moulded part which encloses the honeycomb structure to form end elements 34, as described above.

The cylindrical pipe fitting 46 is open at the end of heat exchanger 10 furthest from fan 14. As indicated in FIG. 1 by arrows A, air is sucked through this opening by the operation of fan 14 and into the first air flow, it passes through end elements 34 into pipe bunch 30, is guided into pipes 32 and passes through end elements 34 closest to fan 14 into the space occupied by inner ring 18, where it flows through fan 14 and finally exits housing 12. The first air flow is thus transported through pipe bunch 30 inside heat exchanger 12.

In contrast, the opposite second air flow is transported through housing 12 in such a way that it enters pipe bunch 30 and circulates around the middle sections 36 of the individual pipes 32 so that heat exchange can take place. In detail, the second air flow is drawn in from the left (arrow B) through the outer blades 28 of fan 14 into the outer ring 20, is transported past a constriction 48 in the inner wall 24 of housing 12 inwards between pipes 32 of pipe bunch 30 and, at the end of pipe bunch 30, is transported outward again around cylindrical pipe fitting 46 so that, finally, the second air flow exits radially outwards.

The constriction 48 is formed by a cylindrical insulating sleeve 50 which lines the inner wall 24 of housing 12 in the vicinity of middle sections 36 and reduces the inner diameter of housing 12. It is also conceivable to form the constriction 48 by means of one or several cupped insulating shells adjoining the inner wall of housing 12. The ends of this insulating sleeve 50 are formed by end surfaces 52,54 with a sloping cross-section, via which the inner diameter of insulating sleeve 50 transitions into the larger inner diameter of adjacent inner wall sections of housing 12. End surfaces 52,54 guide the second air stream radially inwards or outwards. Starting from outer ring 20, the second air flow comes into contact with a first end surface 52 of insulating sleeve 50, via which the second air flow is guided between tubes 32 of bunch 30. The inner cross-section of insulating sleeve 50 is usefully only slightly larger than that of pipe bunch 30, so that bunch 30 is enclosed inside insulating sleeve 50. Hence the second air flow circulates between pipes 32 inside insulating sleeve 50. At the end of bunch 30 the second air flow is guided via the closing end surface 54 back to the outside via cylindrical pipe fitting 46.

Insulating sleeve 50 offers the additional advantage of a reduction in energy losses towards the outside. In addition to thermal insulation, insulating sleeve 50 can also provide acoustic insulation. An insulating shell offers the same advantages. Insulating sleeve 50 is made for example from expanded plastic such as polystyrene or polypropylene. Other plastics such as PVC are also suitable.

Inner wall 24 of housing 12 can have a structured surface, i.e. be provided with beading or such like so that the second air flow is made turbulent. This delivers an additional improvement in the heat transfer. Further, middle sections 36 of pipes 34 may have a structured inner and/or outer surface. These structures may, for example, be formed by beading or projections on said surfaces. The structures may also serve to redirect the flow of air.

Pipes 32 may be standard drawn pipes with a cylindrical cross-section which are widened at their ends into a polygonal cross-section to form end elements 34. These must then merely be grouped together and welded or bonded together to form the pipe bunch.

To ensure a good seal with the ring-shaped enclosure formed by the end 42 of the cylindrical wall 22 and the end 44 of pipe fitting 46, the cross-sections of the end elements 34 on the outside of bunch 30 may differ from those on the inside of bunch 30. This can be seen clearly in FIGS. 2 and 4. Here there are outer end elements such as the ones designated at 56, which differ from the hexagonal cross-section of the other end elements 34 in the middle of bunch 30. A rounded outer surface 58 of this end element 56 serves in this case as a contact surface with the cylindrical wall 22 or pipe fitting 46. The outer contours of the outer end elements 34 thus form a circular circumference of bunch 30 at each end, which can be enclosed with precision inside cylindrical wall 22 and pipe fitting 46.

The invention claimed is:

1. An air-to-air heat exchanger for ventilation systems with two countercurrent air flows, comprising:
    a cylindrical housing for housing the heat exchanger;
    pipes inside the cylindrical housing and inside which a first air flow circulates in the pipes inside the heat exchanger while a second air flow which is countercurrent to the first air flow is disposed in spaces between the pipes and the cylindrical housing such that the first and second air flows form countercurrent air flows;
    a fan for moving the countercurrent air flows, the fan being disposed at one end of the cylindrical housing, with the fan comprising an inner ring and an outer ring arranged concentrically around the inner ring for moving the air in the opposite countercurrent directions, with spaces occupied by the outer ring and inner ring being separated from each other by a cylindrical wall;
    wherein the pipes are formed as a bunch of straight, parallel pipes having central axes which are parallel throughout entire lengths thereof and having:
        first end elements at an end closest to the fan in which the central axes are straight and parallel, wherein the first end elements are tightly disposed together and enclosed in a ring-shaped end of the cylindrical wall, and the first end elements having a first diameter,
        second end elements at an opposite side, in which the central axes are straight and parallel, wherein the second end elements are tightly disposed together and enclosed in an end element of a cylindrical pipe fitting, and the second end elements having a second diameter,
        middle sections between the end elements, in which the pipes are straight and parallel, wherein the middle sections taper in diameter from the first and second end elements such that the middle sections have a smaller diameter than the first and second diameters, and wherein there are spaces inside the bunch between the middle sections;
    an insulating insert which lines an inner wall of the housing in the vicinity of the middle sections and constricts an inner diameter of the housing;
    the insulating insert being spaced radially outwardly from an outermost pipe of the bunch;
    wherein the insulating insert has opposite end surfaces with each end surface having a sloping cross-section, through which an inner diameter of the insulating insert transitions at the end surfaces into a larger inner diameter of adjacent inner wall sections of the housing;
    wherein one said end surface guides the second airstream radially inwards into the spaces between the middle sections to circulate within said spaces around the pipes and to re-exit the spaces between the bunch of pipes radially behind the insulating insert; and
    the bunch of pipes together have an outer circumference in cross-section which is constant adjacent the entire insulating insert including the end surfaces thereof.

2. Air-to-air heat exchanger according to claim 1, wherein at least part of the end elements have a polygonal cross-section.

3. Air-to-air heat exchanger according to claim 2, wherein the polygonal cross-section is a hexagon.

4. Air-to-air heat exchanger according to claim 1, wherein the end elements at each end of the bunch are constructed as one piece from an injection-moulded part and form a honeycomb structure inside this injection-moulded part.

5. Air-to-air heat exchanger according to claim 1, wherein the end elements are tightly connected together, with at least one of:
    the ring-shaped end of the cylindrical wall and
    the end element of the opposite cylindrical pipe fitting by one of:
    a bonding and
    a weld.

6. Air-to-air heat exchanger according to claim 1, wherein the insulating insert is made from expanded plastic.

* * * * *